United States Patent [19]

Hwang et al.

[11] Patent Number: 5,506,871
[45] Date of Patent: Apr. 9, 1996

[54] ADAPTIVE EQUALIZING SYSTEM FOR DIGITAL COMMUNICATIONS

[75] Inventors: Humor Hwang; Yang-seok Choi, both of Suwon, Rep. of Korea

[73] Assignee: Samsung Electronics Co., Ltd., Kyungki-Do, Rep. of Korea

[21] Appl. No.: 253,144

[22] Filed: Jun. 2, 1994

[30] Foreign Application Priority Data

Jun. 2, 1993 [KR] Rep. of Korea .................. 93-9867

[51] Int. Cl.$^6$ ................................. H03H 7/30
[52] U.S. Cl. .................. 375/230; 375/231; 375/232; 375/344; 364/724.19; 364/724.2
[58] Field of Search ........................ 375/12, 13, 14, 375/97; 364/724.19, 724.2; 333/18, 28 R

[56] References Cited

U.S. PATENT DOCUMENTS 5,050,186  9/1991  Gurcan et al. ..................... 375/14
5,068,873  11/1991  Murakami ............................ 375/13
5,283,813  2/1994  Shalvi et al. ........................ 375/12

Primary Examiner—Stephen Chin
Assistant Examiner—Huong Luu
Attorney, Agent, or Firm—Sughrue, Mion, Zinn, Macpeak & Seas

[57] ABSTRACT

An adaptive equalizing system equalizes an unequalized signal and performs carrier recovery for use in a digital communication receiver. An equalizing coefficient is initialized by a constant modulus algorithm (CMA) and the initialized equalizing coefficient is more finely updated by a stop-and-go algorithm (SGA). When the convergency by the CMA reaches a predetermined threshold value, carrier recovery is performed, while when an average value of the phase error during performing the carrier recovery is less than another predetermined threshold value, the equalizing algorithm is converted into the SGA. Thus, the adaptive equalizing apparatus can equalize the received signal more simply and reliably.

10 Claims, 1 Drawing Sheet

ADAPTIVE EQUALIZING SYSTEM FOR DIGITAL COMMUNICATIONS

BACKGROUND OF THE INVENTION

The present invention relates to an equalizing system in a receiver of a digital communication system, and, more particularly, to an adaptive equalizing method and apparatus for recovering a received digital signal more quickly and reliably.

In recent times, there has been several developments in modem technology for transmitting a full digital signal such as high definition television signal and for recovering the transmitted signal. In a modem, the signal transmitted from a transmitter includes noise due to multiplexed paths and is subject to interference and obstacles from other channels.

In high-definition television systems, however, channel errors are highly undesirable as data having a very high compression ratio through a frequency band of 6 MHz is transmitted. As a result, in high-definition television systems, there should be no errors in the transmission data even when there is severe channel distortion. In addition, high-definition systems require reliable modulation and demodulation and error correction to obtain digital data having a high compression ratio.

At present, according to such requirements, the receiver in a digital communication system performs an equalizing process on a received signal in which noise is included and of which the frequency characteristic is altered. Algorithms used in this so called adaptive equalization includes constant modulus algorithm (CMA), a stop-and-go algorithm (SGA) and a decision-directed algorithm (DDA), as examples. The CMA is discussed in "Self-recovering Equalizer and Carrier Tracking in Two Dimensional Data Communication System" by D. N. Godard (IEEE Transactions on Communication, Volume COM-28, No. 11, pp 1867–1875, November 1980). The SGA is also discussed in "Blind Equalization and Carrier Recovery using A Stop-and-Go Decision-directed Algorithm" by G. Picci and G. Prat (IEEE Transactions on Communication Volume COM-26, No. 9, September 1987).

The receiver performs a carrier recovery process for compensating for any phase error in the received signal. The receiver also compensates for phase offset, frequency offset, and phase jitter, etc., which cause mismatch between the carrier phase of the transmitted signal from the transmitter and the carrier phase of the received signal in the receiver, when recovering the carrier.

European Patent Laid-open Publication No. 0,524,559 A2 by Paik et al., published on Jan. 27, 1993, discloses a carrier phase recovery technique which is particularly useful for the recovery of multi-level amplitude modulation data, such as quadrature amplitude modulation. In this reference, a blind equalizing algorithm is used in a carrier recovery loop, in which an equalizing coefficient is initialized using the CMA. Then, if the phase error of the equalized signal matches a predetermined threshold value, the equalizing coefficient is initialized using the DDA.

When the DDA is used at the state of the initialization of the equalizing coefficient, the algorithm conversion between the CMA and the DDA is excessively sensitive to a degree of convergency. Accordingly, it is preferable to use the SGA instead of the DDA.

SUMMARY OF THE INVENTION

Therefore, to solve the above and other problems, one object of the present invention is to provide an adaptive equalizing method capable of removing noise from digital transmission data which is caused by multiplexed paths and channel interference, by adaptively converting between a constant modulus algorithm and a stop-and-go algorithm, and updating an equalizing coefficient for carrier recovery.

Another object of the present invention is to provide an adaptive equalizing apparatus for updating an equalizing coefficient using a stop-and-go algorithm if an error which is generated by an equalizing coefficient of a constant modulus algorithm reaches a predetermined threshold value.

To accomplish the above and other objects of the present invention, there is provided an adaptive equalizing method for digital communications in which an unequalized signal is adaptively equalized in a digital communication receiver for performing carrier recovery. The method includes the steps of: a) initializing an equalizing coefficient based on a constant modulus algorithm, b) receiving the initialized equalizing coefficient and equalizing an unequalized signal to perform carrier phase recovery and to update the initialized equalizing coefficient, c) judging whether a first error value corresponding to the recovered carrier phase is smaller than a predetermined first threshold value, and d) equalizing and carrier-recovering the unequalized signal based on the equalizing coefficient updated by a stop-and-go algorithm when the first error value is smaller than the first threshold value in response to the result of step c).

The above and other objects of the present invention are further accomplished by providing an adaptive equalizing apparatus for digital communications in which an unequalized signal is adaptively equalized in a digital communication receiver for performing carrier recovery. The adaptive equalizing apparatus is composed of an equalizer which receives the unequalized signal and outputs an equalized signal according to an equalizing coefficient, a first coefficient generator which receives the unequalized signal, the equalized signal and the carrier-phase recovered signal and initializes an equalizing coefficient based on the constant modulus algorithm, to update the initialized equalizing coefficient, phase recover means for receiving the equalized signal and outputting the carrier-phase recovered signal and a phase error signal, and a second coefficient generator which receives the unequalized signal, the equalized signal and the output signal of the phase recovery means, and, when a first error signal corresponding to the equalizing coefficient of the first coefficient generator is smaller than a first predetermined threshold value, the equalizing coefficient used for the generation of the equalized signal is generated based on a stop-and-go algorithm.

DETAILED DESCRIPTION OF THE PREFERRED EMBODIMENT

Figure 1:
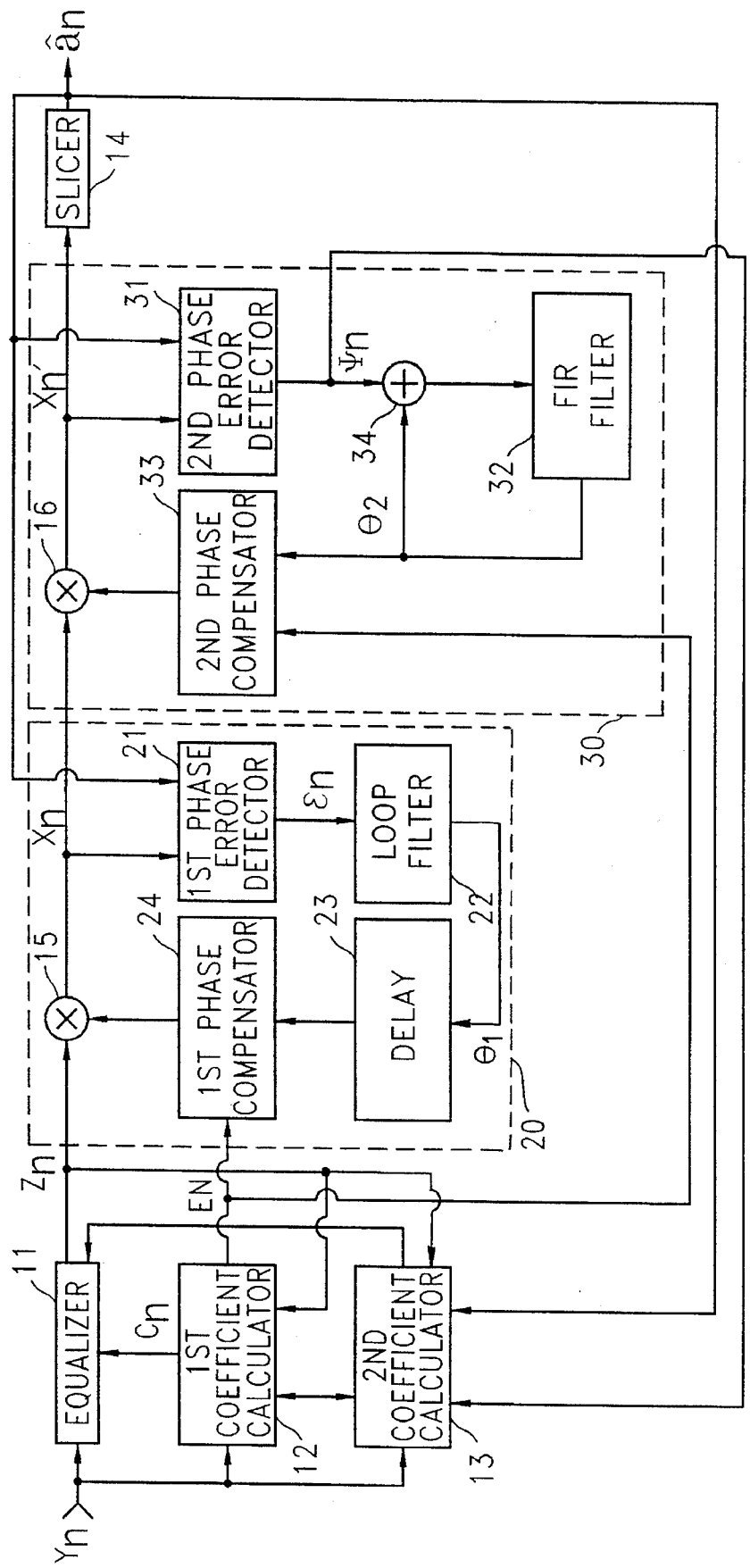
FIG. 1 is a block diagram showing an adaptive equalizing system according to a preferred embodiment of the present invention.

A preferred embodiment of the present invention will be described below in more detail with reference to the accompanying drawing.

An apparatus according to an embodiment of the present invention includes an equalizer 11 for optimally equalizing a signal, coefficient calculators 12 and 13, compensators 20 and 30 for performing the carrier recovery loops, and a slicer 14. The carrier recovery loops may be implemented, for example, as disclosed in "Adaptive Carrier Recovery Systems for Digital Data Communications Receivers" by R. L. Cupo and R. D. Gitlin (IEEE Journal on selected Areas in Communications, Volume 7, No. 9, December 1989). The equalizing coefficients in the equalizer 11 are calculated by the first and second coefficient calculators 12 and 13. While the first coefficient calculator 12 calculates the equalizing coefficient, the second coefficient calculator 13 does not operate. On the other hand, while the second coefficient calculator 13 calculates the equalizing coefficient, the first coefficient calculator 12 does not operate.

The first coefficient calculator 12 initializes the equalizing coefficient using the CMA based on the publication by Godard, when the carrier recovery loop has been turned off. Here, the CMA is a kind of a blind equalization algorithm in which a training signal for catching up with a characteristic of the transmission channel is not inserted into a signal transmitted from the transmitter end. The receiver equalizes the signal at the state of unknowing the characteristic of the transmission channel included in the received signal.

The equalizer 11 equalizes an input signal $Y_n$ according to the equalizing coefficient applied from the second coefficient calculator 13 and outputs a signal $Z_n$. The first coefficient calculator 12 receives the signal $Y_n$ to be equalized and signal $Z_n$ output from the equalizer 11, and updates the equalizing coefficient according to the following equation (1).

$$C_{n+1} = C_n - \lambda_2 Y_n^* Z_n (|Z_n|^2 - R_2) \qquad (1)$$

Here, reference character $R_2$ is a scalar quantity for representing a statistical characteristic of the transmission signal, which is obtained from a final signal $\hat{a}_n$ output from the slicer 14. $R_2$ is represented by the following equation:

$$R_2 = E[|a_n|^4]/E[|a_n|^2].$$

Thus, $R_2$ can be calculated by substituting $\hat{a}_n$ for $a_n$. Also, $C_n$ is an equalizing coefficient at time nT, $\lambda_2$ is the size of the CMA, $Y^*_n$ is a conjugate input signal to be equalized, and $Z_n$ is an output signal of the equalizer 11. The signal $\hat{a}_n$ is supplied to the first coefficient calculator 12 through the second coefficient calculator 13. The first coefficient calculator 12 updates the equalizing coefficient and judges whether the CMA error signal of the following equation (2) is smaller than a predetermined first threshold value.

$$\text{CMA error} = (1/N) \sum_{n=1}^{N} |Z_{nm}|(|Z_n|^2 - R_2) \qquad (2)$$

Here, the CMA signal being smaller than the first threshold value represents that the channel distortion of the received signal to be equalized has been removed to a degree. The first coefficient calculator 12 supplies an enable signal EN to the first phase compensators 24 and 33 of the compensators 20 and 30 to turn on the carrier recovery loop, if it is determined that the CMA error signal is smaller than the first threshold value, that is, the equalizing coefficient is initialized.

If the carrier recovery loop is turned on, the first compensator 20 compensates the frequency offset and the phase offset of the received signal. The first compensator 20 includes a first multiplier 15, a first phase error detector 21, which receives an output signal $X_n$ and the output signal of the slicer 14, a loop filter 22, a delay 23, and a first phase compensator 24. The output of first phase compensator 24 is connected to the first multiplier 15, which multiplies the output signal $Z_n$ of the equalizer 11 and the output signal of first phase compensator 24, and outputs the multiplied signal. The first phase error detector 21 receives the output signal $a_n$ of the slicer 14 and signal $X_n$, and detects a first phase error signal $\epsilon_n$ according to the following equation (3).

$$\epsilon_n = Im\left[ \frac{X_n \cdot \hat{a}_n^*}{|\hat{a}_n|^2} \right] \qquad (3)$$

The phase error $\epsilon_n$ of the above equation (3) is a loop error close to the carrier frequency. The loop error is filtered by the loop filter 22. A phase signal $\theta_1$ output from the loop filter 22 is delayed by the delay circuit 23 for a predetermined time, and is then supplied to the first phase compensator 24. The signal output from the first phase compensator 24 is multiplied by the signal $Z_n$ equalized by the first multiplier 15, which outputs the signal $X_n$ having the frequency offset and the phase offset compensated for.

The second compensator 30 receives the output signal $X_n$ of the first multiplier 15 and the output of the slicer 14, and removes noise having large movement such as jitter. That is, the noise having a wide frequency band. The second compensator 30 includes a second multiplier 16, a second phase error detector 31, which receives the output signal $X_n'$ of the second multiplier 16 and the output of slicer 14, a finite impulse response (FIR) filter 32, and a second phase compensator 33. An adder 34 installed between the second phase error detector 31 and the FIR filter 30 adds an output signal $\psi_n$ of the second phase error detector 31 to an output signal $\theta_2$ of the FIR filter 32. The second phase error signal $\psi_n$ is represented by the following equation (4).

$$\psi_n = Im\left[ \frac{X_n' \cdot \hat{a}_n^*}{|\hat{a}_n|^2} \right] \qquad (4)$$

Here, $\hat{a}_n^*$ is a conjugate of $\hat{a}_n$. The second phase error detector 31 receives the output signal $\hat{a}_n$ of the slicer 14 and output signal $X_n'$ of the second multiplier 16, to generate the second phase error signal $\psi_n$ which is represented by the above equation (4). The signal filtered in the FIR filter 32 is added to the second phase error signal $\psi_n$ supplied from the second phase error detector 31. If the second phase compensator 33 receives the output signal $\theta_2$ of the FIR filter 32 and outputs an error compensating signal, the second multiplier 16 compensates for the error such as jitter included in the signal $X_n$ applied from the first multiplier 15. As a result, the second compensator 30 secondarily phase compensates the signal $X_n$ which has been phase-compensated in first compensator 20.

As described above, the first and second compensators 20 and 30 compensate for the phase offset, the frequency offset, and the phase jitter, and output the compensated signal through the slicer 14. The output signal $\hat{a}_n$ of the slicer 14 is supplied to the first and second phase error detectors 21 and 31 and the second coefficient calculator 13, respectively. The first and second compensators 20 and 30 continue the signal processes for carrier recovery.

While the phase error compensation is performed when the carrier recovery loop is turned on, the second coefficient calculator 13 receives the output signal $\psi_n$ of the second phase detector 31 and judges whether the phase error average value of the following equation (5) is smaller than a second predetermined threshold value.

$$\text{Phase error average value} = (1/N) \sum_{n=1}^{N} |\Psi_n| \qquad (5)$$

Here, $\Psi_n$ represents the phase error including noise. The second threshold value represents a threshold value for converting the CMA into the SGA to update the equalizing coefficient according to a degree of convergency of the equalizer 11. If the phase error average value is smaller than the predetermined second threshold value, the second coefficient calculator 13 outputs the equalizing coefficient and the first coefficient calculator 12 stops the equalizing coefficient output. Thereafter, the updating of the equalizing coefficient is accomplished by the second coefficient calculator 13, which continuously updates the equalizing coefficient using the SGA based on the publication by Picci and Prat referenced above. The SGA is an algorithm for performing a fine tuning operation, which is finer than that of the CMA, and is represented by the following equation (6).

$$C_{n+1,R} = C_{n,R} - \alpha(f_{n,R} \cdot e_{n,R} \cdot Y_{n,R} + f_{n,I} \cdot e_{n,I} \cdot Y_{n,I})$$
$$C_{n+1,I} = C_{n,I} + \alpha(f_{n,R} \cdot e_{n,R} \cdot Y_{n,I} - f_{n,I} \cdot e_{n,I} \cdot Y_{n,R})$$
(6)

Here, subscripts R and I represent a real component and an imaginary component, respectively, $\alpha$ is a step size of the SGA, and $\hat{e}_n$ is a decision error which is represented by the following equation (7).

$$\hat{e}_{n,R} = Z_{n,R} - \hat{a}_{n,R}$$
$$\hat{e}_{n,I} = Z_{n,I} - \hat{a}_{n,I}$$
(7)

Also, $f_n$ is a flag for adjusting the stop or go execution of the SGA and is represented by the following equation (8).

$$f_{n,R} = \begin{cases} 1 \text{ when sgn } \hat{e}_{n,R} \text{ equals sgn } \tilde{e}_{n,R} \\ 0 \text{ when sgn } \hat{e}_{n,R} \text{ does not equal sgn } \tilde{e}_{n,R} \end{cases}$$

$$f_{n,I} = \begin{cases} 1 \text{ when sgn } \hat{e}_{n,I} \text{ equals sgn } \tilde{e}_{n,I} \\ 0 \text{ when sgn } \hat{e}_{n,I} \text{ does not equal sgn } \tilde{e}_{n,I} \end{cases}$$
(8)

Here, $\tilde{e}_n$ is actual error estimation data which is based on the selection of the stop or go execution of the SGA and is represented by the following equation (9).

$$\tilde{e}_{n,r} = Z_{n,r} - (\text{sng} Z_{n,r})\beta_n$$
$$\tilde{e}_{n,i} = Z_{n,i} - (\text{sng} Z_{n,i})\beta_n$$
(9)

Here, $\beta_n$ is a predetermined coefficient. The equalizing coefficient which is initialized by the first coefficient calculator 12 is continuously updated by the second coefficient calculator 13, to become converged to an optimum value for signal equalization. As a result, the slicer 14 outputs a finally adaptively equalized and self-recovered signal $\hat{a}_n$.

As described above, the adaptive equalization system according to the present invention is adaptively converted between the CMA and the SGA in updating the equalizing coefficient. Also, the present invention turns on or off the carrier recovery loop according to the degree of convergency, to thereby converge the equalizing coefficient more quickly and reliably, and to not make the algorithm conversion more sensitive to the degree of convergency of the equalizer.

What is claimed is:

1. An adaptive equalizing method for digital communications in which an unequalized signal is adaptively equalized in a receiver of a digital communication system for performing carrier recovery, said adaptive equalizing method comprising the steps of:

a) initializing an equalizing coefficient based on a constant modulus algorithm (CMA);

b) receiving the initialized equalizing coefficient and equalizing the unequalized signal to perform carrier phase recovery and to update the initialized equalizing coefficient;

c) judging whether a first error value corresponding to the recovered carrier phase is smaller than a first predetermined threshold value; and d) equalizing and carrier-recovering the unequalized signal based on the equalizing coefficient updated by a stop-and-go algorithm (SGA) when the first error value is smaller than the first predetermined threshold value in response to the result of the step c).

2. An adaptive equalizing method according to claim 1, wherein said step a) comprises the steps of:

a1) updating the equalizing coefficient by the following equation:

$$C_{n+1} = C_n - \lambda_2 Y_n^* Z_n (|Z_n|^2 - R_2),$$

where $R_2$ equals $E[|a_n|^4]/E[|a_n|^2]$, $C_n$ is the equalizing coefficient, $\lambda_2$ is a step size of the CMA, $Y_n^*$ is a conjugate unequalized signal, and $Z_n$ is an equalized signal;

a2) judging whether a second error value of the equalized signal by the equalizing coefficient of said step a1) is smaller than a second predetermined threshold value; and a3) determining the equalizing coefficient obtained when the second error value of said step a2) is smaller than said second predetermined threshold value, as the initialized equalizing coefficient.

3. An adaptive equalizing method according to claim 2, wherein said step a2) comprises the step of generating a CMA error calculated by the following equation as the second error value:

$$\text{CMA error} = (1/N) \sum_{n=1}^{N} |Z_n|(|Z_n|^2 - R_2).$$

4. An adaptive equalizing method according to claim 1, wherein said step c) comprises the step of generating an average value of a phase error calculated by the following equation as the first error value:

Phase error average value=

$$(1/N) \sum_{n=1}^{N} |\psi_n|$$

in which $\psi_n$ represents the phase error.

5. An adaptive equalizing method according to claim 1, wherein said step d) comprises the step of updating the equalizing coefficient by the following equations:

$$C_{n+1,R} = C_{n,R} - \alpha(f_{n,R} \cdot \hat{e}_{n,R} \cdot Y_{n,R} + f_{n,I} \cdot \hat{e}_{n,I} \cdot Y_{n,I})$$
$$C_{n+1,I} = C_{n,I} + \alpha(f_{n,R} \cdot \hat{e}_{n,R} \cdot Y_{n,I} - f_{n,I} \cdot \hat{e}_{n,I} \cdot Y_{n,R})$$

$$f_{n,R} = \begin{cases} 1 \text{ when sgn } \hat{e}_{n,R} \text{ equals sgn } \tilde{e}_{n,R} \\ 0 \text{ when sgn } \hat{e}_{n,R} \text{ does not equal sgn } \tilde{e}_{n,R} \end{cases}$$

$$f_{n,I} = \begin{cases} 1 \text{ when sgn } \hat{e}_{n,I} \text{ equals sgn } \tilde{e}_{n,I} \\ 0 \text{ when sgn } \hat{e}_{n,I} \text{ does not equal sgn } \tilde{e}_{n,I} \end{cases}$$

$$\hat{e}_{n,R} = Z_{n,R} - \hat{a}_{n,R}$$
$$\hat{e}_{n,I} = Z_{n,I} - \hat{a}_{n,I}$$
$$\tilde{e}_{n,r} = Z_{n,r} - (\text{sgn} Z_{n,r})\beta_n$$
$$\tilde{e}_{n,i} = Z_{n,i} - (\text{sgn} Z_{n,i})\beta_n$$

where $C_n$ is the equalizing coefficient, $\alpha$ is a step size of the SGA, $Y_n$ is an unequalized signal, $Z_n$ is an equalized signal, $\beta_n$ is a predetermined coefficient, and subscripts R and I represent a real component and an imaginary component, respectively.

6. An adaptive equalizing apparatus for digital communications in which an unequalized signal is adaptively equalized in a digital communication receiver for performing carrier recovery, comprising:

an equalizer which receives the unequalized signal and outputs an equalized signal according to an equalizing coefficient;

a first coefficient generator which receives the unequalized signal, the equalized signal and a carrier-phase recovered signal and initializes an equalizing coefficient based on a constant modulus algorithm (CMA), to update the initialized equalizing coefficient;

phase recovery means for receiving the equalized signal and outputting the carrier-phase recovered signal and a phase error signal; and a second coefficient generator which receives the unequalized signal, the equalized signal and the output signals of the phase recovery means, and generates the equalizing coefficient based on a stop-and-go (SGA) algorithm when a first error signal corresponding to the equalizing coefficient of the first coefficient generator is smaller than a first predetermined threshold value.

7. An adaptive equalizing apparatus according to claim 6, wherein said first coefficient generator receives the unequalized signal and the equalized signal to update the equalizing coefficient, determines the equalizing coefficient obtained when a second error signal corresponding to the updated equalizing coefficient is smaller than a second predetermined threshold value as the initialized equalizing coefficient, and enables the phase recovery means for operation if the initialized equalizing coefficient is determined.

8. An adaptive equalizing apparatus according to claim 7, wherein said updated coefficient is calculated by the following equation:

$$C_{n+1} = C_n - \lambda_{2n} * Z_n (|Z_n|^2 - R_2),$$

where $R_2$ equals $E[|a_n|^4]/E[|a_n|^2]$, $C_n$ is the equalizing coefficient, $\lambda_2$ is a step size of the CMA, $Y_n^*$ is a conjugate unequalized signal, and $Z_n$ is the equalized signal.

9. An adaptive equalizing apparatus according to claim 8, wherein said second error signal is a CMA error calculated by the following equation as the second error value:

$$CMA\ error = (1/N) \sum_{n=1}^{N} |Z_n|(|Z_n|^2 - R_2).$$

10. An adaptive equalizing apparatus according to claim 9, wherein said second coefficient generator calculates an average value of the phase error calculated by the following equation:

$$\text{Phase error average value} = (1/N) \sum_{n=1}^{N} |\psi_n|$$

in which $\psi_n$ represents a phase error; and an equalizing coefficient is updated by the following equation if the phase error average value is smaller than the first predetermined threshold value:

$$C_{n+1,R} = C_{n,R} - \alpha(f_{n,R} \cdot \hat{e}_{n,R} \cdot Y_{n,R} + f_{n,I} \cdot \hat{e}_{n,I} \cdot Y_{n,I})$$
$$C_{n+1,I} = C_{n,I} + \alpha(f_{n,R} \cdot \hat{e}_{n,R} \cdot Y_{n,I} - f_{n,I} \cdot \hat{e}_{n,I} \cdot Y_{n,R})$$

$$f_{n,R} = \begin{cases} 1 & \text{when sgn } \hat{e}_{n,R} \text{ equals sgn } \tilde{e}_{n,R} \\ 0 & \text{when sgn } \hat{e}_{n,R} \text{ does not equal sgn } \tilde{e}_{n,R} \end{cases}$$

$$f_{n,I} = \begin{cases} 1 & \text{when sgn } \hat{e}_{n,I} \text{ equals sgn } \tilde{e}_{n,I} \\ 0 & \text{when sgn } \hat{e}_{n,I} \text{ does not equal sgn } \tilde{e}_{n,I} \end{cases}$$

$$\hat{e}_{n,R} = Z_{n,R} - \hat{a}_{n,R}$$
$$\hat{e}_{n,I} = Z_{n,I} - \hat{a}_{n,I}$$
$$\tilde{e}_{n,r} = Z_{n,r} - (\text{sgn} Z_{n,r})\beta_n$$
$$\tilde{e}_{n,i} = Z_{n,i} - (\text{sgn} Z_{n,i})\beta_n,$$

where $C_n$ is the equalizing coefficient, $\alpha$ is a step size of the SGA, $Y_n$ is the unequalized signal, $Z_n$ is the equalized signal, $\beta_n$ is a predetermined coefficient, and subscripts R and I represent a real component and an imaginary component, respectively.

\* \* \* \* \*